United States Patent
Flohr et al.

(10) Patent No.: US 7,804,988 B2
(45) Date of Patent: Sep. 28, 2010

(54) METHOD FOR FILTERING OF TOMOGRAPHIC 3D DISPLAYS ON THE BASIS OF THE RECONSTRUCTION OF VOLUME DATA

(75) Inventors: Thomas Flohr, Uehlfeld (DE); Michael Grasruck, Erlangen (DE); Rainer Raupach, Adelsdorf (DE)

(73) Assignee: Siemens Aktiengesellschaft, Munich (DE)

( * ) Notice: Subject to any disclaimer, the term of this patent is extended or adjusted under 35 U.S.C. 154(b) by 1078 days.

(21) Appl. No.: 11/504,593

(22) Filed: Aug. 16, 2006

(65) Prior Publication Data

US 2007/0040831 A1 Feb. 22, 2007

(30) Foreign Application Priority Data

Aug. 17, 2005 (DE) ........................ 10 2005 038 940

(51) Int. Cl.
*G06T 17/00* (2006.01)
*G06K 9/00* (2006.01)

(52) U.S. Cl. ...................................... 382/128; 382/131
(58) Field of Classification Search ......... 382/128–132, 382/260; 345/424
See application file for complete search history.

(56) References Cited

U.S. PATENT DOCUMENTS

| 5,351,305 | A | | 9/1994 | Wood et al. | |
|---|---|---|---|---|---|
| 5,771,318 | A | * | 6/1998 | Fang et al. | 382/261 |
| 7,203,353 | B2 | * | 4/2007 | Klotz et al. | 382/131 |
| 2003/0016854 | A1 | * | 1/2003 | Inoue et al. | 382/132 |
| 2003/0071220 | A1 | * | 4/2003 | Bruder et al. | 250/369 |

(Continued)

FOREIGN PATENT DOCUMENTS

DE 10 2004 008 979 A1 9/2005

(Continued)

OTHER PUBLICATIONS

Pascal et al. "Regulation Method in Non-Rigid Registration: II. Isotropic Energies, Filters and Splines", INRIA, No. 4243 Aug. 2001.*

(Continued)

*Primary Examiner*—Vu Le
*Assistant Examiner*—Amara Abdi
(74) *Attorney, Agent, or Firm*—Harness, Dickey & Pierce, P.L.C.

(57) ABSTRACT

A filter method for tomographic 3D displays is disclosed, in which a volume model is used for display, which reproduces the volume of the examination object in the form of a large number of three-dimensional image voxels, and the image value of each voxel reproduces one object-specific characteristic of the examination object in this volume. According to the method, the original image voxels are processed using a 2D filter which is the same over the entire image area, and two different linear filters with selected directions which are obtained from the extremes of the previously calculated variances thus resulting in three data records with differently filtered image voxels, and in which, furthermore, the original image voxels and the filtered image voxels are mixed using local weights to form a result image. In addition, original image data can be processed using a steepening linear filter with a filter direction in the direction of the maximum local variance, resulting in a data record which is mixed into the final image with locally different weighting.

22 Claims, 6 Drawing Sheets

U.S. PATENT DOCUMENTS

2005/0100236 A1 * 5/2005 Kong et al. .................. 382/261
2005/0190984 A1 * 9/2005 Fischer et al. ................ 382/260
2005/0200733 A1 * 9/2005 Malvar ....................... 348/272

FOREIGN PATENT DOCUMENTS

WO     WO 01/63323 A1    8/2001

OTHER PUBLICATIONS

T.F.Chan et al.: <<The digital TV filter and nonlinear denoising >>, 1999, http://citeseer.nj.nec.com/article/chan01digital.html.

G.Winkler et al. : << Recent Developments in Edge-Preserving Smoothing >>, 98-13, 1998, http://www.gsf.de/institute/ibb ; ISSN: 07211694.

V.Aurich, J.Weule : << Non-Linear Gaussian Filters Performing Edge Preserving Diffusion >>, Proceedings 17. DAGM Symposium über Mustererkennung, Springer Verlag, 1995, pp. 538-545.

* cited by examiner

METHOD FOR FILTERING OF TOMOGRAPHIC 3D DISPLAYS ON THE BASIS OF THE RECONSTRUCTION OF VOLUME DATA

PRIORITY STATEMENT

The present application hereby claims priority under 35 U.S.C. §119 on German patent application number DE 10 2005 038 940.6 filed Aug. 17, 2005, the entire contents of which is hereby incorporated herein by reference.

FIELD

The invention generally relates to a method for filtering of tomographic 3D displays of an examination object. For example, to may relate to one in which a volume model, which subdivides the volume of the examination object into a large number of three-dimensional image voxels with individual image values, is used to display the examination object, and where the image value of each voxel reproduces one object-specific characteristic of the examination object in this volume.

BACKGROUND

Fundamentally, methods for the suppression of noise in volume data are known. For example, linear low-pass filtering can be used to effectively reduce the noise, but in this case the clarity of the data material and thus the quality of the display of small structures deteriorate. This simple approach can thus be used only to a limited extent in order to improve the image material.

Another method is based on two-dimensional or three-dimensional iterative filtering of the data material, with information about the position and orientation of edges being included in each step. Reference is made in this context, for example, to T. Chan, S. Osher, and J. Shen; *The digital TV filter and non-linear denoising*; http://citeseer.nj.nec.com/article/chan01digital.html, 1999. Tech. Report CAM 99-34, Department of Mathematics, UCLA Los Angeles, Calif., 1999; IEEE Trans. Image Process., to appear [date called up May 15, 2003] and Aurich V., et al.; *Non-linear Gaussian Filters Performing Edge Preserving Diffusion*; Proceedings 17th DAGM Symposium on pattern recognition, Springer 538-545, 1995.

On the basis of the "central limit-value record", these methods cited above lead to a Gaussian filter characteristic which frequently does not correspond to the normal image impression for radiologists, and is thus rejected. A further problem is the delay time of algorithms such as these, which is in the region of minutes per axial slice because of the large number of iterations, thus making the method unsuitable for clinical use.

The German patent application, which was not published prior to this application, with the file reference DE 10 2004 008 979.5-53 proposed an improvement in the method for filtering of tomographic 3D displays of an examination object in which a volume model is used to display the examination object, subdivides the volume of the examination object into a large number of three-dimensional image voxels with individual image values, and the image value of each voxel reproduces one object-specific characteristic of the examination object in this volume. Furthermore, on the basis of the reconstruction of the entire volume of each image voxel, the variances are calculated in a predetermined area or radius R, in order to determine sudden contrast changes and their spatial orientation with their tangential planes T, with the image values within the tangential plane T being filtered using a two-dimension convolution process, and with the original voxel data items then being mixed with the filtered voxel data items in a weighted manner. The entire disclosure content and the of Patent Application DE 10 2004 008 979.5-53 is incorporate herein by reference, in its entirety and for all purposes.

In principle, this method is admittedly a step in the right direction, but it may have a disadvantage in that this method uses non-defined two-dimensional filters non-iteratively, and these must be calculated explicitly for each voxel. In consequence, the method is highly computation-intensive and may not offer an optimum solution for practical use.

In addition to the unreasonably high level of computation complexity, known CT displays are also subject to the further problem of the so-called blooming effect, as a result of which plaques with a high CT value, for example calcification areas, apparently have a larger volume, and remaining vessel diameters are measured incorrectly, specifically as being too small.

SUMMARY

A method is disclosed for, in at least one embodiment, filtering of tomographic 3D displays on the basis of the reconstruction of volume data, which on the one hand works sufficiently quickly and on the other hand also produces the desired good filter results. Filtering such as this may be used, in at least one embodiment, to reduce or even solve the problem of incorrect size display of the vessels in the area of plaques.

The inventors have found, in at least one embodiment, that a significant acceleration of the filtering process can be achieved while retaining the results in comparison to the method described in patent application DE 10 2004 008 979.5-53 by not using undefined two-dimensional filters which must be calculated explicitly for each voxel value, but by processing an advantageous combination of a single 2D filter, which is the same over the entire image area, with two different linear filters with selected directions, which result from the extremes of the local variances, and by then carrying out a weighted mixing of original image voxels and filter image voxels using local weights.

The inventors accordingly propose, in at least one embodiment, that the method which is known per se for filtering of tomographic 3D displays of an examination object, preferably for filtering of medical tomographic displays of a patient, be improved, in which a volume model which subdivides the volume of the examination object into a large number of three-dimensional image voxels with individual image values, corresponding to a first data record with original image voxels, is subdivided in a known manner in order to display the examination objects, and the image value of each voxel reproduces one object-specific characteristic of the examination object in this volume, in which the variances of the image values are calculated in a predetermined area or radius R on the basis of the reconstruction of the entire volume for each image voxel, the direction of the greatest variance is determined for each image voxel, in order to identify sudden contrast changes and their spatial orientation with their tangential planes T, and the direction of the least variance is determined for each image voxel on the tangential plane. The method, in at least one embodiment, is now improved in that the original image voxels are processed using a 2D filter which is the same over the entire image area, and two different linear filters with selected directions which result from the extremes of the previously calculated variances, resulting in three data records with differently filtered image voxels and in that the original image voxels and the filtered image voxels are mixed using local weights for the result image.

This method according to at least one embodiment of the invention considerably speeds up the computation time by a factor of about 10, with the results in terms of noise suppression and maintenance of the clarity of structures being comparable with those for considerably more complex filtering from the patent application cited above.

In one particular embodiment, the inventors propose that a two-dimensional isotropic convolution process be carried out on two-dimensionally planar voxel sets as the 2D filter, resulting in a second data record of voxels $I_{IF}$. An isotropic convolution process such as this can be carried in the space domain, but it is more advantageous to carry out this isotropic convolution process in the frequency domain, in which case the first data record, plane-by-plane, corresponding to the orientation of the 2D filter, which is the same over the entire image area, is transformed to the frequency domain by use of a Fourier transformation, is multiplied there by the isotropic 2D filter function, and is then transformed back to the space domain.

According to at least one embodiment of the invention, a first local and linear filter can be applied to the first data record and is in each case aligned in the direction of the local minimum variance $\vec{v}_{min}$, and produces a third data record of voxels $I_{ALF,min}$.

In a corresponding manner, a second linear locally variable filter which is aligned at right angles to the tangential plane T can be used, in which the perpendicular to the tangential plane is defined by $\vec{v}_\perp = \vec{v}_{min} \times \vec{v}_{max}$, and the fourth data record of voxels $I_{ALF,max}$ is produced by its use. With respect to this filtering, it should expressly be noted that the locally variable filter mentioned may also be identical for all of the voxels.

In order to ensure the normalization of the result data record, when the four data records are mixed, the first data record $I_{org}$ can be subtracted, in a weighted form, from the weighted sum of the second to fourth data records $I_{IF}$, $I_{ALF,min}$ and $I_{ALF,\perp}$.

With respect to the weighting for the mixing of the four data records, this weighting can be selected as a function of the isotropy/anisotropy of the area immediately surrounding the image voxel under consideration, and of the local variance.

In this case, it is particularly advantageous for the weighted mixing process of the four data records to be carried out using the following formulae:

$$I_{final} = (1-w) \cdot I_{orig} + w \cdot [w^{3D} \cdot I_{3D} + (1-w^{3D}) \cdot I_{2D}], \text{ where}$$

$$I_{3D} = I_{IF} + I_{ALF,min} - I_{orig} \text{ and}$$

$$I_{2D} = w^{IF} \cdot I_{IF} + w(1-w^{IF}) \cdot [I_{ALF,min} + w^\perp \cdot (I_{ALF,\perp} - I_{orig})],$$

where the weighting factors have the following meanings:
w measure of the minimum local variance $v_{min}$ at the pixel under consideration,
$w^{3D}$ measure of the anisotropy $\eta^{3D}$ in three-dimensional space,
$w^{IF}$ measure of the anisotropy $\eta^{IF}$ on the plane of the filter $I_{IF}$,
$w^\perp$ measure of the anisotropy $\eta^\perp$ in the directions $v_\perp$ and $v_{min}$.

In this case, the anisotropy $\eta^{3D}$ can be calculated in three-dimensional space using the formula:

$$\eta^{3D} = \frac{v_{max} - v_{min}}{v_{max} + v_{min}}$$

in which case, by way of example, the weighting factor $w^{3D}$ can be obtained from $w^{3D} = 1 - \eta^{3D}$.

The anisotropy $\eta^{IF}$ can be calculated on the plane of the filter $I_{IF}$ using the formula:

$$\eta^{IF} = \frac{v^{IF}_{max} - v^{IF}_{min}}{v^{IF}_{max} + v^{IF}_{min}}$$

where $v^{IF}_{max}$ and $v^{IF}_{min}$ represent the maximum and minimum variances from the directions of the filter $I^{IF}$. In this case, once again, the weighting factor $w^{IF}$ can be calculated, by way of example, from $w^{IF} = 1 - \eta IF$.

Furthermore, the anisotropy $\eta^\perp$ can be displayed in the directions $v_\perp$ and $v_{min}$ using the formula:

$$\eta^\perp = \frac{v_\perp - v_{min}}{v_\perp + v_{min}}$$

in which case the weighting factor $w^\perp$ can advantageously be calculated from $w^\perp = 1 - \eta^\perp$.

It should expressly be noted that different functional relationships between the weighting factors and the respectively stated relevant variance are possible and that the stated relationships are only by way of example. It would also equally well be possible to use any desired, possibly linear, function, for example $w = a\eta^b + c$ or the like, which would provide the user with the capability to appropriately adapt the parameters for an optimum filter result.

At least one embodiment of the invention also allows the display of vessels in the area of plaque to be improved. This is because, in the case of CT angiography, the definition of vessel diameters in the area of stenoses is frequently faulty. If these stenoses are caused by calcified plaques, then the deposits appear to be significantly larger than their actual extent, thus exacerbating the correct determination of the remaining volume of vessels. This effect is generally known as "blooming".

In some cases, this effect can even result in it not being possible to make any diagnostically usable statement whatsoever. This problem of the "blooming effect" is caused by the fact that a CT system has a pixel function of finite width because of the finite size of the detector channels, of the focus, etc. and as a function of the reconstruction algorithm. In this case, any given object is always reproduced convolved with the pixel function. The 3 dB size of the object is thus independent of the attenuation, but scales the profile function absolutely with the attenuation value of the material.

Volumes are typically determined by finding out the number of pixels above a specific, fixed threshold value. The greater the attenuation value and the softer the convolution core of the reconstruction, the greater is the extent to which the volume of the socle of the distribution is in consequence included in the measurement.

In principle, the effect can be reduced considerably by the choice of a very sharp convolution core for the image reconstruction. However, large contributions at high frequencies also result in the image noise rising more than proportionally, so that the characterization of the nominal volume with the aid of threshold values is problematic because the signal-to-noise ratio is worse. One solution to this problem would be to increase the dose, which would at the same time result in high position resolution and low noise. However, a solution such as this is forbidden, because it would increase the danger to the patient from ionizing radiation.

With regard to this group of problems, the inventors have found that it would be sensible not to increase the clarity of the image over the entire image area, but that it would be advantageous to use a filter which increases the clarity only in the area of the calcifications, in order to determine their volumes more accurately, or to assess the directly surrounding tissue, such as vessels and the like. In this case, rather than using a simple linear filter which, for example, can be integrated into the convolution process for the CT reconstruction, it is more advantageous to solve this problem by means of a non-linear filter which is matched to the local morphological characteristics of the voxel data.

For example, in the case of a filter rule such as this which determines the degree of filtering as a function of the amount of calcification actually present, it is worthwhile in conjunction with CT examinations either to define the degree of calcification on the basis of threshold values of HU units or, even better, unambiguously to identify the location of calcifications by the use of simultaneous scans with different energy spectra, and to weight the corresponding steepening filter more sharply at these points.

In the context of the special filtering method described above, it is also possible to use specific preferred directions for a steepening linear filter, in which case the direction of $v_{max}$, which is already known per se in the method, can be used for this purpose. On the basis of the determination of the variances, this direction vector is at right angles to a locally existing edge. A filter such as this thus specifically improves the clarity of the locally greatest sudden contrast change.

If this additional filtering is carried out, then, for example, a data record which has been processed by this filtering can additionally be mixed into the overall result of the filtering process, in which case the weight of the mixing of this steepened component should be qualitatively chosen to be greater the higher the local contrast is. This can be characterized, for example, by the magnitude of $v_{max}$. This locally directed noise increase is not perceived negatively by the eye, because of the high contrast. Furthermore, on the basis of the weighted mixing process, the mean image noise can nevertheless be reduced efficiently at the same time, and the basic clarity of the output data record can be chosen to be higher than in the case of conventional images used for evaluation.

Thus, within the scope of at least one embodiment of the invention, the inventors also propose that the abovementioned filter rule or some other filter rule be extended, on the basis of which the original data is additionally processed using a steepening linear filter with a filter direction in the direction of the maximum local variance, resulting in a fifth data record which is inserted into the final image in a weighted manner.

This additional filter can be used primarily to display the areas with high calcification with particularly high image clarity, so that the strength of the steepening filter can be chosen as a function of the degree of calcification in the image area under consideration.

Since, in principle, it is known for the degree of calcification to be determined by way of a CT scan using two different energy spectra, this variant can also be used here to identify calcified areas, in particular in conjunction with the preprocessing of CT records.

On the basis of the methods described above, the inventors are also proposing a system for production of tomographic displays, preferably a computer-tomographic system having at least two beam sources which scan an object with beam cones of different width, with the attenuation of the radiation as it passes through the object being determined, and with slice images or volume data relating to the local attenuation of the object being determined from this with the aid of a computation unit and programs or program modules stored in it, and which contains a stored program code which simulates the method described above during operation.

BRIEF DESCRIPTION OF THE DRAWINGS

The invention will be described in more detail in the following text with reference to one example embodiment and with the aid of the figures, in which the only features which are illustrated are those which are necessary for understanding of the invention. The following reference symbols are used for this purpose: 1: CT system; 2: first X-ray tube; 3: first detector; 4: optional second X-ray tube; 5: optional second detector; 6: gantry housing; 7: patient; 8: patient couch; 9: system axis; 10: computation and control unit; 11: edge in the tomographic image; 12: 2D filter; 13: edge identification; 14: axially isotropic filter; 15: adaptive linear filtering in the direction $v_\perp$; 16: adaptive linear filtering in the direction $v_{min}$; 17: mixing with local weights; 18: CT record without filtering; 19: CT record with filtering according to at least one embodiment of the invention; 20: difference image between FIGS. 18 and 19; 21: steepening linear filtering in the direction $v_{min}$; 22: general filtering of a tomographic record; 24: CT record without filtering with calcification; 25: filtered CT record with calcification; 26: difference record between FIGS. 24 and 25; 25: area of calcification; 28: uniform structureless area in the CT records 18 and 19; 30: voxel set for the convolution along $v_{min}$; 31: 2D filter; $Prg_1$ to $Prg_n$: computer programs for carrying out the method according to at least one embodiment of the invention.

In the figures, in detail.

DETAILED DESCRIPTION OF THE EXAMPLE EMBODIMENTS

Figure 1:
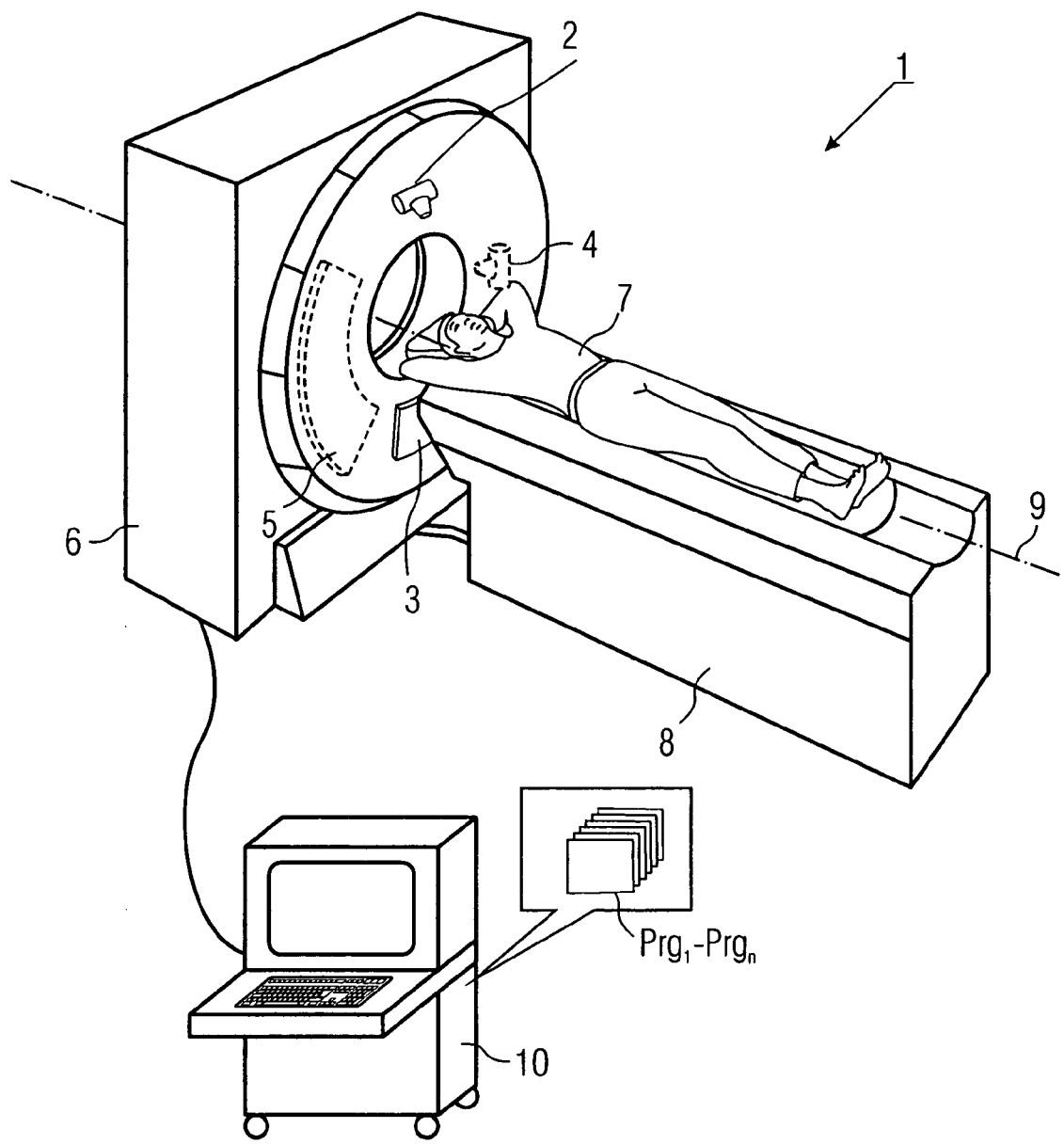
FIG. 1 shows a CT system.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Referencing the drawings, wherein like reference numerals designate identical or corresponding parts throughout the several views, example embodiments of the present patent application are hereafter described.

FIG. 1 shows an example of a tomographic system, in this case in the form of a CT system 1, by which tomographic representations of a patient 7 can be recorded. The CT system 1 includes a gantry housing 6 in which an X-ray tube 2 with a detector 3 located opposite it is located. The X-ray tube 2 and the detector 3 rotate about a system axis 9 and scan the patient 7, while this patient 7 is being pushed through the scanning area of the X-ray/detector combination via a movable patient couch 8. A second X-ray tube 4 and a second detector 5 can optionally additionally be located on the gantry, with the second X-ray tube 4 being operated with a different acceleration voltage to that of the X-ray tube 2. This makes it possible to selectively identify the calcification in the scanned tissue, for example with one CT.

The data gathered by the detectors 3 and 5 is passed to a control and computation unit 10, where the actual reconstruction and image preprocessing including the filtering according to at least one embodiment of the invention of the CT displays are carried out with the aid of programs $Prg_1$ to $Prg_n$. All reconstruction methods known from the prior art may be used for the purposes of at least one embodiment of the invention.

It should be noted that although at least one embodiment of the invention is preferably used for CT image display purposes, where it provides particularly good results, it is, however, also possible for the method according to at least one embodiment of the invention to be used for filtering tomographic records in conjunction with other tomographic display systems, in particular of patients. For example, nuclear magnetic resonance records or positron-emission-tomographic records or records which have been recorded with combinations of such methods can also be processed further using the method according to at least one embodiment of the invention.

In accordance with the method according to at least one embodiment of the invention, variances from one image voxel are calculated in a large number of different directions in order to make it possible to identify sudden local contrast changes.

Figure 2:
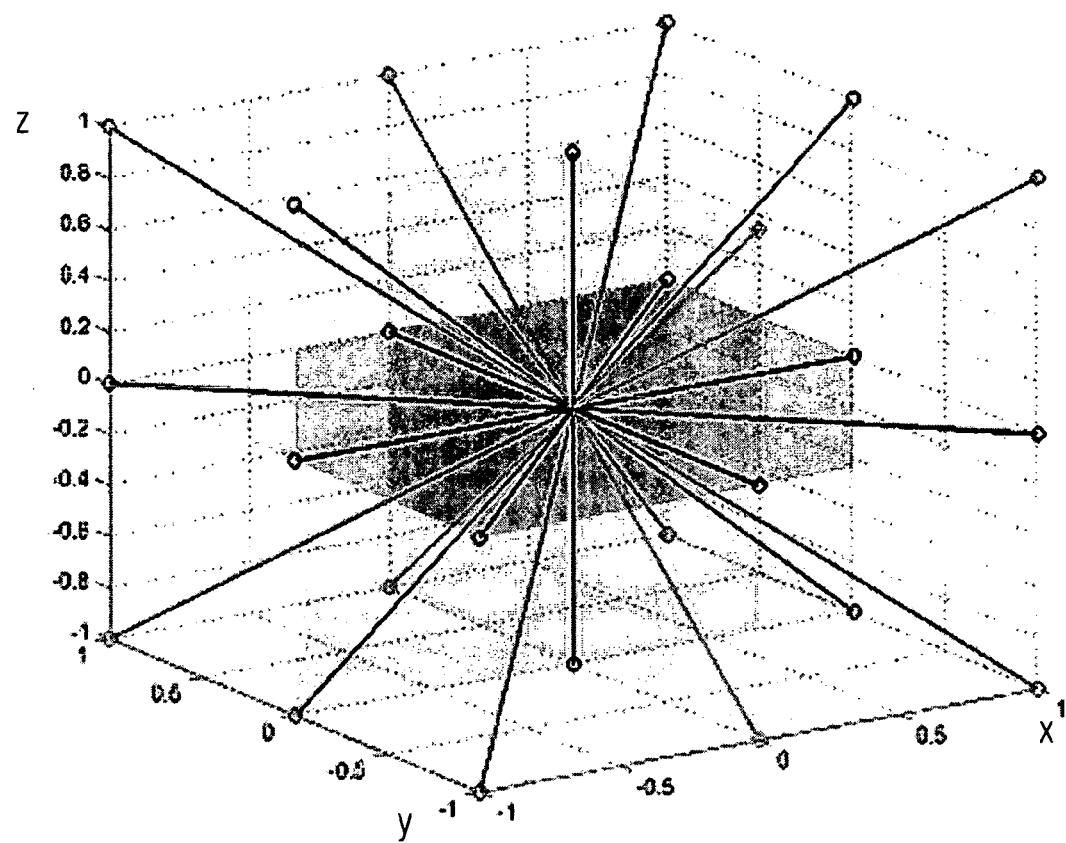
FIG. 2 shows an illustration of selected directions for variance calculation.

FIG. 2 shows an example of a volume in which a voxel v is located centrally, in which the preferred directions shown here are used for the sum of the calculated variances. By way of example, these are the three canonic axes, six surface diagonals of the surfaces covered by these axes, and four spatial diagonals, which are defined by this cubic volume. The variance in thirteen different directions is thus calculated for each voxel, with the size of the volume for which this is calculated being intended to be in the order of magnitude of the correlation length of the one-dimensional filter which will be used later.

Figure 3:
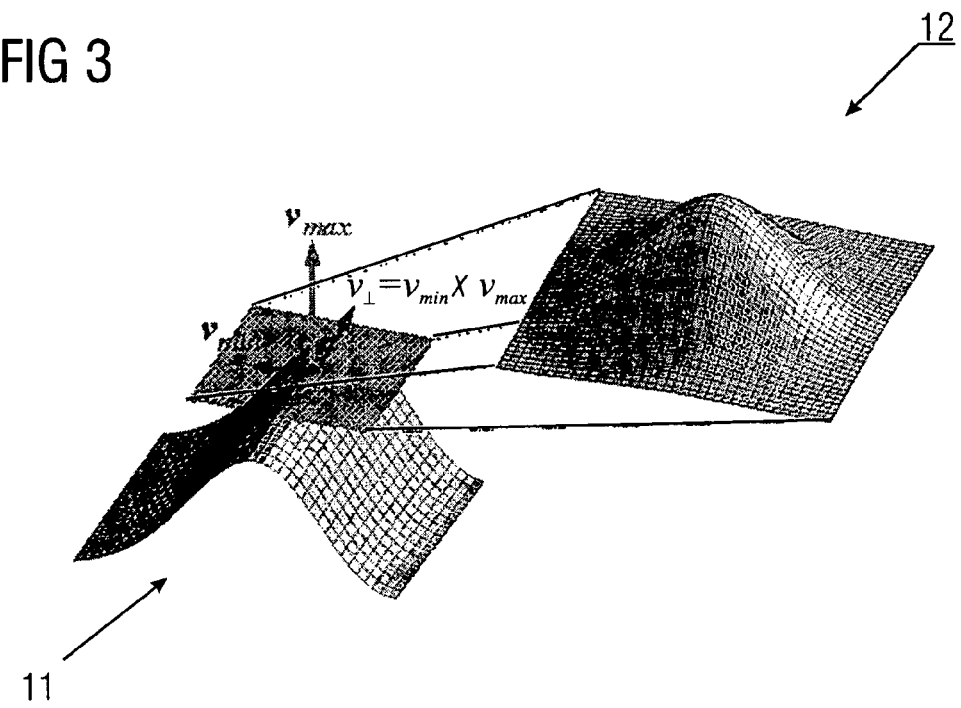
FIG. 3 shows an illustration of an example of an edge in a CT display and 2D filter.

Using the example of an edge 11 illustrated at the bottom on the left, FIG. 3 shows the position of the typical variances $v_{max}$, $v_{min}$ and $v_\perp$, with the orientation of $v_\perp$ being determined by the relationship $v_\perp = v_{min} \times v_{max}$, and thus being at right angles to the plane covered by $v_{max}$ and $v_{min}$. In this case, the direction of $v_{max}$ is always at right angles to the edge 11, as is illustrated in FIG. 3. One example of a 2D filter 12 as is applied to the individual voxels over the entire area of the image, according to at least one embodiment of the invention, is shown at the top on the right.

Figure 4:
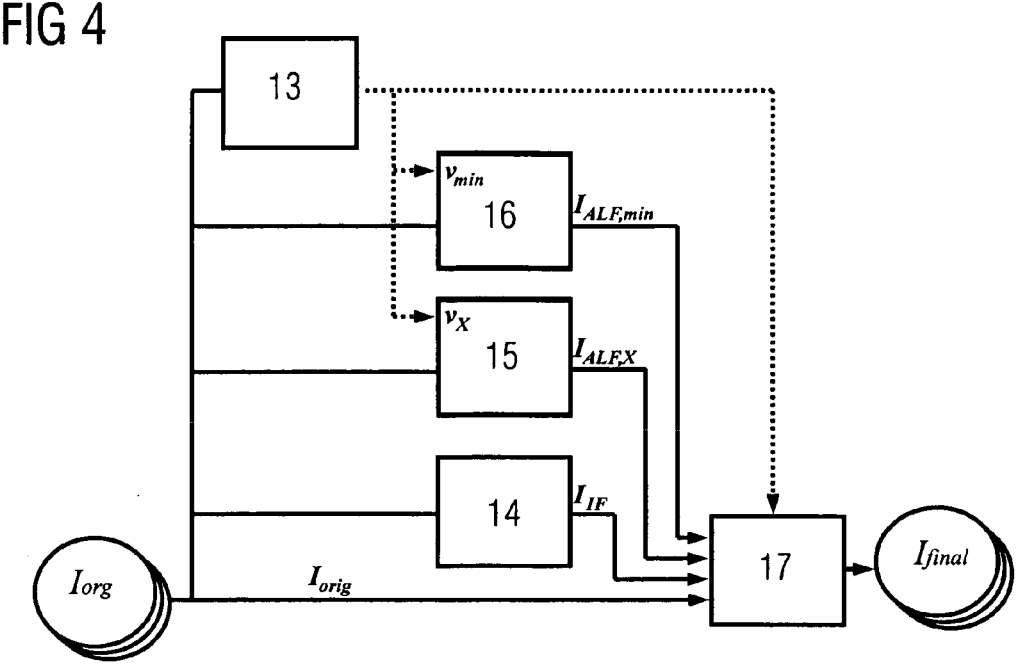
FIG. 4 shows a schematic illustration of the method according to at least one embodiment of the invention.

FIG. 4 shows a method scheme for the filtering according to at least one embodiment of the invention, but without consideration of the calcification aspect. The original data records with unfiltered image voxels are illustrated at the bottom on the left in this schematic illustration. On the basis of these data records, the edge detection process is carried out in method step 13, as has been described above, and as is described in very great detail, for example, in Patent Application DE 10 2004 008 979.5-53, the entire contents of which is incoporated herein by reference. There, the directions of the vectors $v_{min}$ and $v_{max}$ are determined an the direction of $v_\perp$ is identified.

The original image data is now filtered in method steps 14, 15 and 16—corresponding to the rule described in the following text.

Method step 14 relates to filtering of the axial planes using a fixed 2D filter. In this case, by way of example, a two-dimensional isotropic convolution process can be carried out on two-dimensional planar voxel sets, equivalently, in the frequency domain. For this purpose, the axial images are transformed to the frequency domain with the aid of a Fourier transformation, where they are multiplied by an isotropic 2D filter function and are then transformed back to the space domain. It should be noted that, alternatively, it is also possible to carry out a convolution process directly in the space domain, in which case one variant or the other can be carried out more quickly, depending on the hardware being used.

Such filtering is the same for the entire data record, and the result is now stored in the new data record $I_{IF}$. Furthermore, two locally different filtering processes are carried out in the steps 15 and 16, whose local differences are dependent on the directions of the vectors $v_{min}$ and $v_\perp$.

Linear filtering is carried out in the $v_x$ direction in method step 15 by means of a convolution process with a one-dimensional core, in which case this may be the same for the entire data record, with the only difference being the direction of the filter corresponding to the direction of the vector $v_\perp$.

In a corresponding manner, linear filtering is likewise carried out in method step 16, but in this case in the direction of the vector $v_{min}$. This can also be done by way of a convolution process with a one-dimensional core, which may be identical over the entire data record and, in this case as well, the direction of the filter is adapted locally in accordance with the direction of minimum variance $v_{min}$. The two method steps 15 and 16 thus result in new data records $I_{ALF,\perp}$ and $I_{ALF,min}$, which are then processed further.

During the further processing, the mixing of the four existing data records $I_{IF}$, $I_{ALF,\perp}$ and $I_{ALF,min}$ with $I_{orig}$ is now carried out, with the weights of the mixtures being dependent on the area surrounding the respective voxel under consideration. The following principles are observed during this mixing process:

If the area surrounding a voxel is isotropic, that is to say the values of $v_{min}$ and $v_{max}$ are comparable, then a 3D filter can be used efficiently for smoothing. Since this is not available, a suitable combination is formed with the data records $I_{IF}$ and $I_{ALF}$. In this case, the original voxel must be subtracted, in order that it is not counted twice. The element of the component which has been pseudo-3D-filtered in this way is calculated as a function of the isotropy, with the weight being very small when the anisotropy is high, and vice versa.

If anisotropy is found, then a 1D to 2D filter can be constructed from the existing filtering processes, and is matched to the local characteristics. For this purpose, the anisotropies are considered on the axial plane and the $v_{min}/v_\perp$ plane. If an isotropic situation occurs on one of these planes, then a "pseudo-2D filter" is combined from the existing filters. For greater anisotropy, a one-dimensional filter is left in the direction of $v_{min}$.

The overall weight of the contributions mentioned above is set as a function of the local variance, with a large variance meaning a small weight, and vice versa. In this case, use is made of the fact that the eye perceives noise to a lesser extent in the vicinity of high-contrast structures. At the same time, this makes it possible to ensure that small high-contrast structures are retained. The local variance $v_{min}$ is used as a measure in this case, since this is free of structural noise.

The principle of this idea of adaptive mixing is illustrated once again in FIGS. 5 to 8.

Figure 5:
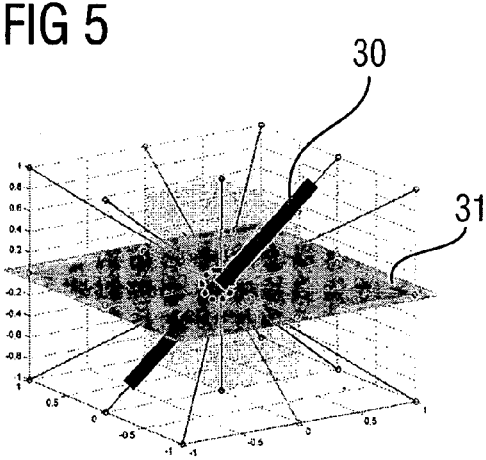
FIG. 5 shows an illustration of a pseudo-3D filter in an isotropic environment.

FIG. 5 shows, schematically, the production of a 3D filter from the combination of the data records of the axial isotropic filtering process $I_{IF}$ and the adaptive linear filter $I_{ALF,min}$ with the direction $v_{min}$, where $I_{3D}=I_{IF}+I_{ALF,min}-I_{orig}$. The area 31 on the xy plane in this case represents the fixed 2D filter or the voxels included. 30 represents the point set of the voxels for the convolution process along $v_{min}$. The local anisotropy can in this case be calculated using the formula $$\eta^{3D} = \frac{v_{max} - v_{min}}{v_{max} + v_{min}}$$

where the local weight $w^{3D}$ for $I_{3D}$ is assumed to be small when $\eta^{3D}$ is large, and is assumed to be large when $\eta^{3D}$ is small. By way of example: $w^{3D}=1-\eta^{3D}$.

Figure 6:
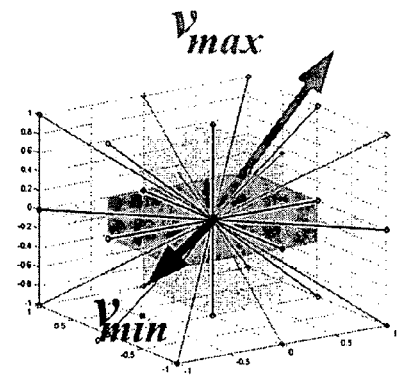
FIG. 6 shows an illustration of local anisotropy with $v_{max}$ and $v_{min}$.

The vectors $v_{min}$ and $v_{max}$ are illustrated in FIG. 6.

Figure 7:
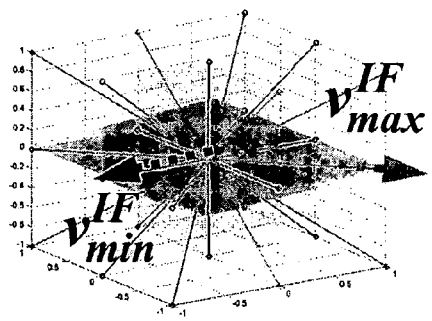
FIG. 7 shows an illustration of axial anisotropy in an anisotropic environment with $v^{IF}_{max} + v^{IF}_{min}$.
Figure 8:
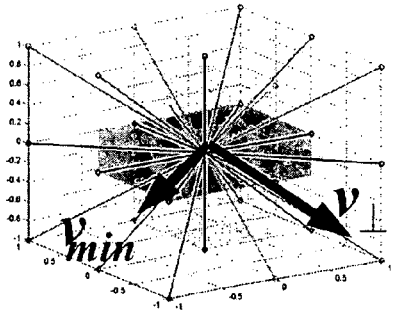
FIG. 8 shows an illustration of perpendicular anisotropy in an anisotropic environment with $v_\perp + v_{min}$.

FIGS. 7 and 8 show an anisotropic situation for the 1D to 2D filter. FIG. 7 shows axial anisotropy, in which case this axial anisotropy can be calculated using:

$$\eta^{IF} = \frac{v_{max}^{IF} - v_{min}^{IF}}{v_{max}^{IF} + v_{min}^{IF}}$$

In this case, the weight for the data record $I_{IF}$ can be determined during the mixing with the weighting factor $w^{IF}$, which is small when the axial anisotropy $\eta^{IF}$ is large, and is large when the axial anisotropy $\eta^{IF}$ is small. By way of example, the weighting factor $w^{IF}$ can be calculated using $w^{IF}=1-\eta^{IF}$.

FIG. 8 shows the criterion for vertical anisotropy $\eta^\perp$, in which case its magnitude is calculated using:

$$\eta^\perp = \frac{v_\perp - v_{min}}{v_\perp + v_{min}}$$

and the weight for the data record $I_{ALF,\perp}$ is determined using the weighting factor $w^\perp$, which is assumed to be small for large values of $\eta^\perp$, and large for small values of $\eta^\perp$.

Thus, overall, data records which have already been filtered and the original data record are mixed in the method step 17 in FIG. 4, in which case the following formulae are used, taking into account the abovementioned criteria:

$$I_{final}=(1-w)\cdot I_{orig}+w\cdot[w^{3D}\cdot I_{3D}+(1-w^{3D})\cdot I_{2D}], \text{ where}$$

$$I_{3D}=I_{IF}+I_{ALF,min}-I_{orig} \text{ and}$$

$$I_{2D}=w^{IF}\cdot I_{IF}+w(1-w^{IF})\cdot[I_{ALF,min}+w^\perp\cdot(I_{ALF,\perp}-I_{orig})],$$

where the weighting factors have the following meanings:
w measure of the minimum local variance $v_{min}$ at the pixel under consideration,
$w^{3D}$ measure of the anisotropy $\eta^{3D}$ in three-dimensional space
$w^{IF}$ measure of the anisotropy $\eta^{IF}$ on the plane of the filter $I_{IF}$,
$w^\perp$ measure of the anisotropy $\eta^\perp$ in the directions $v_\perp$ and $v_{min}$.

Figure 9:
FIG. 9 shows an unfiltered CT record of a heart.
Figure 10:
FIG. 10 shows the record from FIG. 9, filtered.

If a filter rule such as this is applied to the illustration 18 shown by way of example in FIG. 9, then this results in the illustration shown in FIG. 10.

Essentially, this shows a reduction in the noise of about 40% in the transition from the illustration 18 in FIG. 9 to the illustration 19 in FIG. 10. By way of example, the standard deviation of the image values of a uniform area 28 in the illustration 18 is 61.5 HU, while a standard deviation of the image values in the same area 28 in the illustration 19 after the filtering process has been carried out according to the invention is 37.8 HU. In order to achieve this image improvement, approximately 2.6 times the dose would have to be used for the record without additional filtering.

Figure 11:
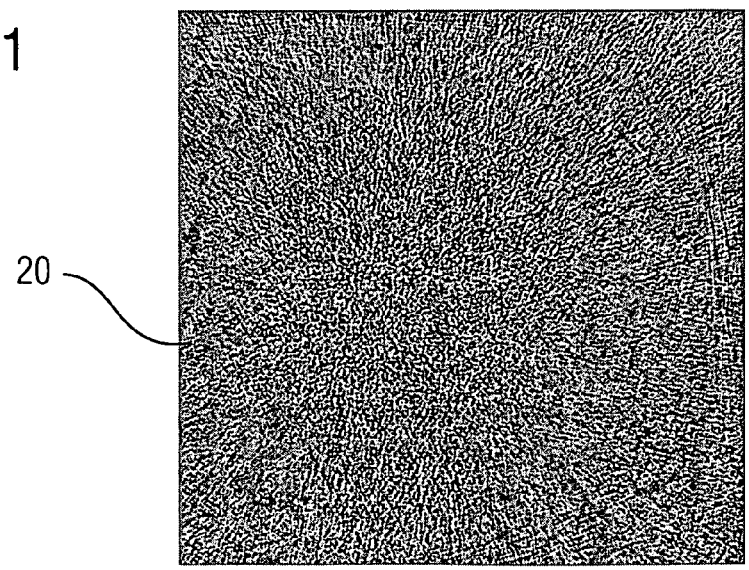
FIG. 11 shows the difference record between FIGS. 9 and 10.

The difference image 20 between the two illustrations 18 and 19 in FIGS. 9 and 10 is illustrated in FIG. 11. It is evident that no significant structures can be seen in this difference image 20, so that these structures have not been removed during the filtering of the image, either, thus achieving an optimum identification capability, despite the noise being minimized.

Figure 12:
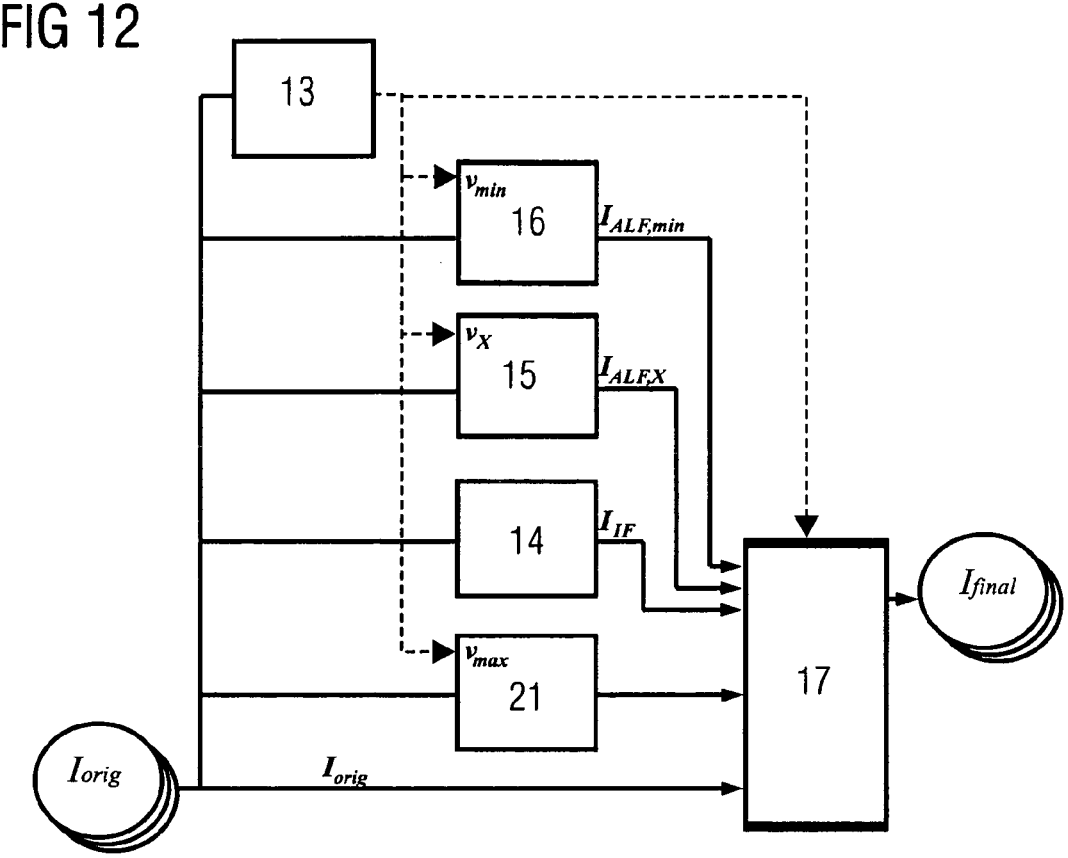
FIG. 12 shows a schematic illustration of the method according to at least one embodiment of the invention with calcification correction.

In a corresponding manner to the method described above for filtering and the extension of the filter method shown there by way of additional steepening filtering, which takes account of the presence of calcifications in specific image areas, FIG. 12 shows the extension of the filter method according to the invention by the addition of this step 21 of additional filtering of the original image with a steepening, adaptive filter. The rest of the method corresponds to the method steps in FIG. 4.

Figure 13:
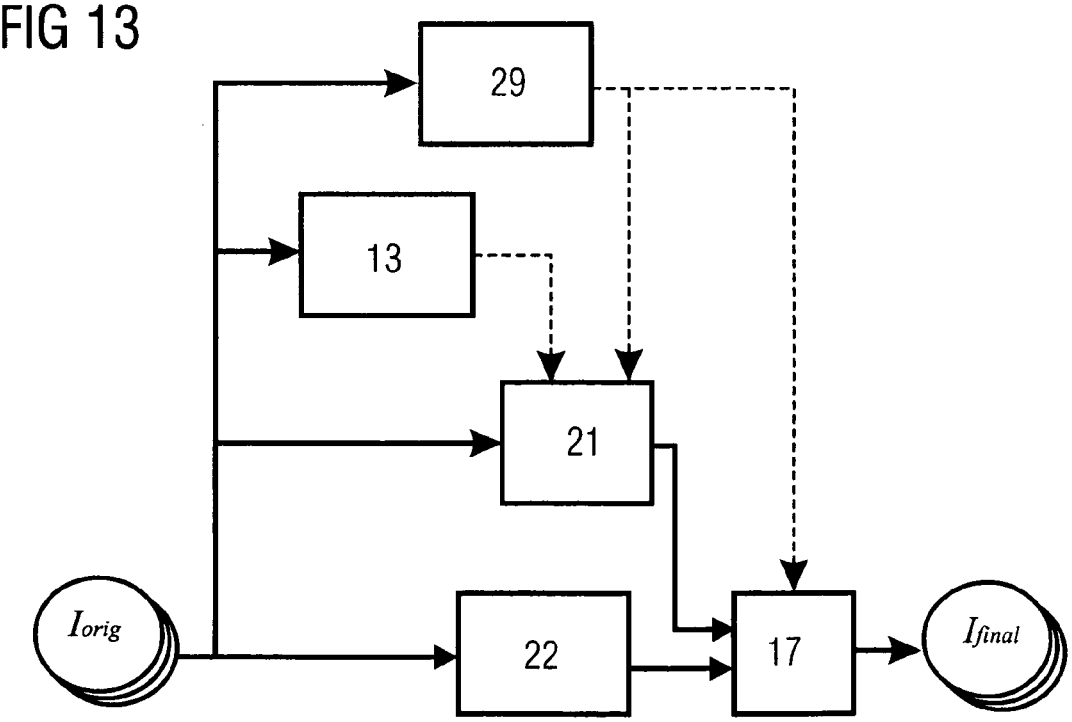
FIG. 13 shows a schematic illustration of general filtering with calcification correction.

In addition, FIG. 13 shows a simple extension of a filter method which is known per se in order to improve tomographic records in which case a filtering process which is known per se is carried out in step 22 on the original data record $I_{org}$ here, while an adaptive filtering process is carried out in step 21 as a function of the calcification, as found in step 29, of the respectively considered image area, after which the filtered data is mixed in step 17, in which case local weighting is also carried out in this case, as a function of the degree of calcification found, with a final data record $I_{final}$ being produced.

Figure 14:
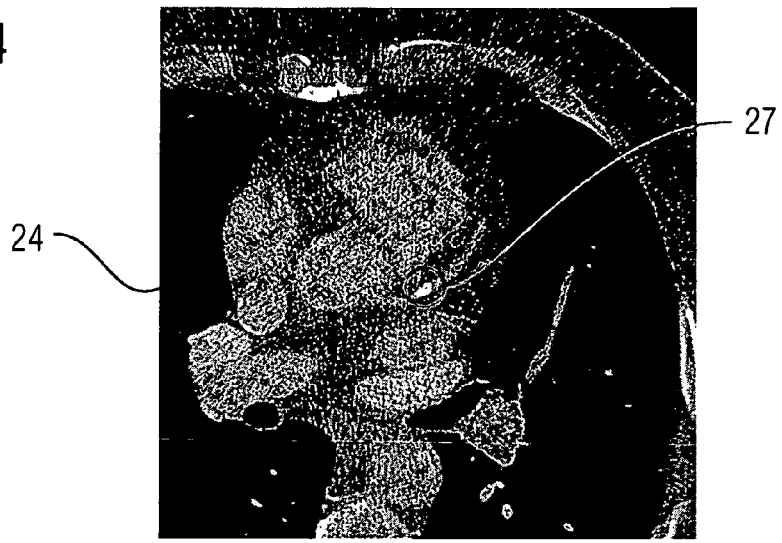
FIG. 14 shows an unfiltered CT record of a heart with local calcification.
Figure 15:
FIG. 15 shows the record from FIG. 14, filtered.

FIG. 14 shows an example of a CT record 24 which has typical calcification of plaque in the area 27. This record has been filtered with the aid of the method according to at least one embodiment of the invention—using the method scheme from FIG. 12. The record 25 which results from this is illustrated in FIG. 15, in which case the improved clarity in the area of the calcification can clearly be seen in the area 27.

Figure 16:
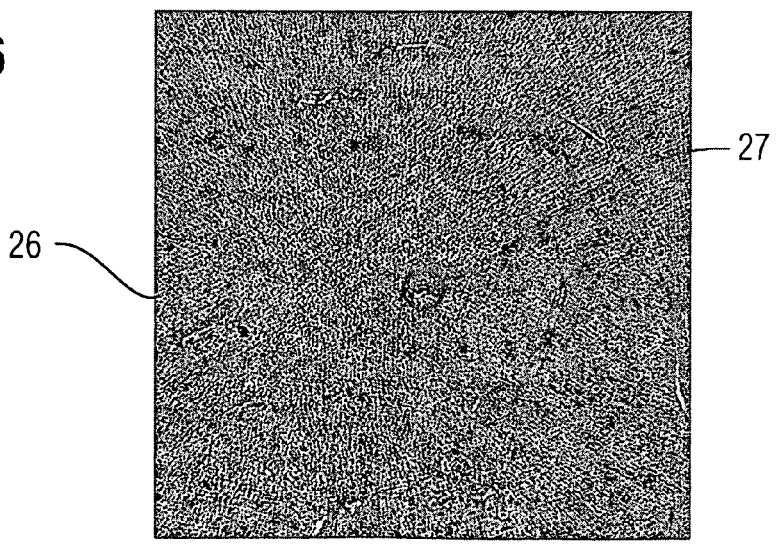
FIG. 16 shows the difference record between FIGS. 14 and 15.

FIG. 16 together with the image 26 once again shows a difference image between the two records 24 and 25, in which the considerable influence of the local filter can be seen in the area of the calcification 27.

It is self-evident that the features of embodiments of the invention mentioned above can be used not only in the respectively stated combination but also in other combinations or on their own without departing from the scope of the invention.

Overall, at least one embodiment of the invention thus describes a method for filtering of tomographic 3D displays of an examination object, in which the examination object is displayed using a volume model which subdivides the volume of the examination object into a large number of three-dimensional image voxels with individual image values and the image value of each voxel reproduces one object-specific characteristic of the examination object in this volume, in which case, according to the invention, the original image voxels $I_{org}$ are processed using a 2D filter which is the same over the entire image area and two different linear filters with selected directions, which result from the extremes of the previously calculated variances $\vec{v}_{min}$, $\vec{v}_{max}$, thus resulting in three data records with differently filtered image voxels $I_{IF}$, $I_{ALF,min}$ and $I_{ALF,\perp}$ and the original image voxels $I_{org}$ and the filtered image voxels $I_{IF}$, $I_{ALF,min}$ and $I_{ALF,x}$ are mixed using local weights to form a result image $I_{final}$.

In addition, at least one embodiment of the invention also describes a method for preprocessing of tomographic 3D displays of medical tomographic displays of a patient by way of at least one linear and/or three-dimensional filtering process, in which the original data is additionally processed using a steepening linear filter with a filter direction in the direction of the maximum local variance $\vec{v}_{max}$, so that a data record $I_{Bloom}$ is produced which is mixed into the final image $I_{final}$ with locally different weighting.

At least one embodiment of the invention therefore provides a filter which in the end has a similarly high Q-factor as that disclosed in Patent Application DE 10 2004 008 979.5-53, but which, because of the advantageous mixing of simple filter rules, leads to a considerably faster computation result, and is thus considerably more relevant for practical use. It has also been, shown that additional consideration of the calcification found in scanned areas during the filtering results in a considerably better identification capability, and reduces the so-called "blooming" effect.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program and computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a computer readable media and is adapted to perform any one of the aforementioned methods when run on a computer device (a device including a processor). Thus, the storage medium or computer readable medium, is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for filtering of tomographic 3D displays of an examination object, comprising:

using, by a system for production of tomographic displays, a volume model, which subdivides the volume of the examination object into a large number of three-dimensional image voxels with individual image values, corresponding to a first data record with original image voxels, to display the examination object; and reproducing, using the image value of each voxel, one object-specific characteristic of the examination object in this volume, the reproducing including, calculating, on the basis of the reconstruction of the entire volume for each image voxel, the variances of the image values in an area or radius, determining the direction of the greatest variance ($\vec{v}_{max}$) for each image voxel, in order to identify sudden contrast changes and their spatial orientation with their tangential planes T, determining the direction of least variance ($\vec{v}_{min}$) for each image voxel on the tangential plane T, processing the original image voxels using a 2D filter which is the same over the entire image area, and two different linear filters with selected directions which result from the extremes of the previously calculated variances ($\vec{v}_{min}$, $\vec{v}_{max}$), resulting in three data records with differently filtered image voxels ($I_{IF}$, $I_{ALF,min}$ and $I_{ALF,\perp}$), and mixing the original image voxels and the filtered image voxels using local weights for the result image.

2. The method as claimed in claim 1, wherein a two-dimensional isotropic convolution process is carried out on two-dimensionally planar voxel sets as the 2D filter, and a second data record of voxels is produced.

3. The method as claimed in claim 2, wherein the isotropic convolution process is carried out in the space domain.

4. The method as claimed in claim 2, wherein the isotropic convolution process is carried out in the frequency domain.

5. The method as claimed in claim 4, wherein the isotropic convolution process is carried out in the frequency domain by transforming the first data record, plane-by-plane, corresponding to the orientation of the 2D filter, which is the same over the entire image area, to the frequency domain by means of a Fourier transformation, by being multiplied there by the isotropic 2D filter function, and by then being transformed back to the space domain.

6. The method as claimed in claim 1, wherein the first linear filter is locally variable and is aligned in the direction of the local minimum variance, resulting in a third data record of voxels.

7. The method as claimed in claim 1, wherein the second linear filter is locally variable and is aligned at right angles to the minimum and maximum local variance, and results in the fourth data record of voxels.

8. The method as claimed in claim 1, wherein, when four data records are mixed, the first data record is subtracted, in a weighted form, from the weighted sum of the second to fourth data records.

9. The method as claimed in claim 8, wherein the weighting for the mixing of the four data records is selected as a function of the isotropy/anisotropy of the area immediately surrounding the image voxel under consideration, and of the local variance.

10. The method as claimed in claim 1, wherein a weighted mixing of four data records is carried out using the following formulae:

$$I_{final}=(1-w) \cdot I_{orig}+w \cdot [w^{3D} \cdot I_{3D}+(1-w^{3D}) \cdot I_{2D}], \text{ where}$$

$$I_{3D}=I_{IF}+I_{ALF,min}-I_{orig} \text{ and}$$

$$I_{2D}=w^{IF} \cdot I_{IF}+w(1-w^{IF}) \cdot [I_{ALF,min}+w^{\perp} \cdot (I_{ALF,\perp}-I_{orig})],$$

where the weighting factors have the following meanings:
w measure of the minimum local variance $v_{min}$ at the pixel under consideration,
$w^{3D}$ measure of the anisotropy $\eta^{3D}$ in three-dimensional space,
$w^{IF}$ measure of the anisotropy $\eta^{IF}$ on the plane of the filter $I_{IF}$,
$w^{\perp}$ measure of the anisotropy $\eta^{\perp}$ in the directions $v_{\perp}$ and $v_{min}$.

11. The method as claimed in claim 10, wherein the anisotropy $\eta^{3D}$ is calculated in three-dimensional space using:

$$\eta^{3D} = \frac{v_{max} - v_{min}}{v_{max} + v_{min}}.$$

12. The method as claimed in claim 11, wherein the weighting factor $w^{3D}$ is calculated using: $w^{3D}=1-\eta^{3D}$.

13. The method as claimed in claim 10, wherein the anisotropy $\eta^{IF}$ is calculated on the plane of the filter $I_{IF}$ using:

$$\eta^{IF} = \frac{v_{max}^{IF} - v_{min}^{IF}}{v_{max}^{IF} + v_{min}^{IF}}$$

where $v^{IF}_{max}$ and $v^{IF}_{min}$ represent the maximum and minimum variances on the plane of the filter $I^{IF}$.

14. The method as claimed in claim 10, wherein the weighting factor $w^{IF}$ is calculated using: $w^{IF}=1-\eta^{IF}$.

15. The method as claimed in claim 10, wherein the anisotropy $\eta^{\perp}$ is calculated in the directions $v_{\perp}$ and $v_{min}$ using:

$$\eta^{\perp} = \frac{v_{\perp} - v_{min}}{v_{\perp} + v_{min}}.$$

16. The method as claimed in claim 10, wherein the weighting factor $w^{\perp}$ is calculated using: $w^{\perp}1-\eta^{\perp}$.

17. A method for preprocessing of tomographic 3D displays of medical tomographical displays of a patient via at least one filtering process, the method comprising:
processing, by a system for production of tomographic displays, original data using a steepening linear filter with a filter direction in the direction of the maximum local variance ($\vec{v}_{max}$), so that a data record is produced, and is inserted into a final image with locally different weighting; wherein
a strength of the steepening filter is chosen as a function of the degree of calcification in the image area under consideration.

18. A method for preprocessing of tomographic 3D displays of medical tomographical displays of a patient via at least one filtering process, the method comprising:
processing, by a system for production of tomographic displays, original data using a steepening linear filter with a filter direction in the direction of the maximum local variance ($\vec{v}_{max}$), so that a data record is produced, and is inserted into a final image with locally different weighting; wherein
a mixing weight of the steepening filter is chosen as a function of the degree of calcification of the image area under consideration.

19. The method as claimed in claim 17, wherein the degree of calcification is determined by way of a CT scan using two different energy spectra.

20. A system for production of tomographic displays, comprising:
at least two beam sources to scan an object with beam cones of different width, an attenuation of the radiation as it passes through the object being determined, and at least one of slice images and volume data relating to the local attenuation of the object being determined from using a computation unit and at least one of programs and program modules, including program code, being stored therein to perform,
using a volume model, which subdivides the volume of the examination object into a large number of three-dimensional image voxels with individual image values, corresponding to a first data record with original image voxels, to display the examination object; and
reproducing, using the image value of each voxel, one object-specific characteristic of the examination object in this volume, the reproducing including,
calculating, on the basis of the reconstruction of the entire volume for each image voxel, the variances of the image values in an area or radius,
determining the direction of the greatest variance for each image voxel, in order to identify sudden contrast changes and their spatial orientation with their tangential planes T,
determining the direction of least variance for each image voxel on the tangential plane T,
processing the original image voxels using a 2D filter which is the same over the entire image area, and two different linear filters with selected directions which result from the extremes of the previously calculated variances, resulting in three data records with differently filtered image voxels, and
mixing the original image voxels and the filtered image voxels using local weights for the result image.

21. The method of claim 1, for filtering of medical tomographic displays of a patient.

22. A computer readable medium including program segments for, when executed on a computer device, causing the computer device to implement the method of claim 1.

* * * * *

UNITED STATES PATENT AND TRADEMARK OFFICE
CERTIFICATE OF CORRECTION

| | |
|---|---|
| PATENT NO. | : 7,804,988 B2 |
| APPLICATION NO. | : 11/504593 |
| DATED | : September 28, 2010 |
| INVENTOR(S) | : Thomas Flohr et al. |

Page 1 of 1

It is certified that error appears in the above-identified patent and that said Letters Patent is hereby corrected as shown below:

Title page, item (30) should read as follows:

(30)    Foreign Application Priority Data

Aug. 17, 2006   (DE) ............... 10 2005 038 940

Signed and Sealed this

Fourteenth Day of December, 2010

David J. Kappos
*Director of the United States Patent and Trademark Office*